United States Patent
Yanagi et al.

(10) Patent No.: US 7,887,287 B2
(45) Date of Patent: Feb. 15, 2011

(54) TURBOFAN JET ENGINE

(75) Inventors: Ryoji Yanagi, Tokyo (JP); Hisao Futamura, Tokyo (JP); Hitoshi Fujiwara, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 813 days.

(21) Appl. No.: 11/902,564

(22) Filed: Sep. 24, 2007

(65) Prior Publication Data

US 2008/0075580 A1    Mar. 27, 2008

(30) Foreign Application Priority Data

Sep. 27, 2006    (JP) .............................. 2006-262916

(51) Int. Cl.
*F02K 3/02*    (2006.01)
(52) U.S. Cl. ........................ 415/145; 415/147; 60/226.1
(58) Field of Classification Search ................... 415/79, 415/145, 147; 60/226.1
See application file for complete search history.

(56) References Cited

U.S. PATENT DOCUMENTS 3,792,584 A * 2/1974 Klees .......................... 415/79
4,222,234 A * 9/1980 Adamson .................... 60/226.1
5,383,332 A * 1/1995 Angel ......................... 60/228

FOREIGN PATENT DOCUMENTS

EP    426500 A1 *    5/1991

* cited by examiner

*Primary Examiner*—Igor Kershteyn
(74) *Attorney, Agent, or Firm*—Westerman, Hattori, Daniels & Adrian, LLP

(57) ABSTRACT

To provide a turbofan jet engine for a supersonic aircraft, which enables a supersonic cruise with small additional drag due to engine installation while minimizing the jet noise at takeoff. In the turbofan jet engine, two fans, i.e., a front fan and an aft fan, are disposed, and an air inlet and an air outlet are provided on each of the front and aft fans, whereby at takeoff, air is introduced to each of the air inlets of the front and aft fans to drive the front and aft fans in parallel, and the air is then ejected from each of the outlets. On the other hand, during a supersonic cruise, an inlet of an aft fan duct is coupled to an outlet of a front fan duct, where external air is introduced only to an air inlet of the front fan duct and the air compressed through the front fan is fed to the aft fan duct and further compressed through the aft fan, and ejected from a nozzle, so that the front and aft fans are driven in series.

6 Claims, 4 Drawing Sheets

(HIGH BYPASS RATIO PATTERN DURING TAKEOFF)

(LOW BYPASS RATIO PATTERN DURING SUPERSONIC CRUISE)

(HIGH BYPASS RATIO PATTERN DURING TAKEOFF)

(LOW BYPASS RATIO PATTERN DURING SUPERSONIC CRUISE)

(HIGH BYPASS RATIO PATTERN DURING TAKEOFF)

(LOW BYPASS RATIO PATTERN DURING SUPERSONIC CRUISE)

TURBOFAN JET ENGINE

BACKGROUND OF THE INVENTION

1. Field of the Invention

The present invention relates to a turbofan jet engine, and particularly to a turbofan jet engine that is suitable for a propelling device for an aircraft that flies at supersonic airspeeds during a cruise.

2. Description of the Related Art

For a supersonic aircraft, an engine with small frontal area is preferable from the view point of drag reduction because a wave drag comes out only at supersonic speed which is largely dependent on the total frontal area of the aircraft including the frontal area of the engines. On the other hand, for such an engine with small frontal area, the speed of the exhaust jet needs to be relatively high and the bypass ratio low compared to the modern high bypass ratio engines for subsonic aircraft under the condition that the same level of thrust is required. The high speed exhaust jet causes a noise problem around the airport because the noise level generally increases in proportion to the eighth power of the exhaust jet speed.

In order to reduce the jet noise, noise suppression devices have been developed which are added downstream of the jet engine such as the lobe mixer and the mixer ejector. Even though they have some effects on suppressing the noise, they are not easy to be in practical use because they are still too long and too heavy compared to the total engine size and weight if it has a considerable effect on suppressing the noise.

In order to obtain the thrust required for supersonic flight while suppressing the noise generated at takeoff, variable cycle engines have been proposed and examined which have incorporated therein a variable mechanism for changing the bypass ratio. U.S. Pat. No. 3,841,091 proposes a system which is configured such that two turbojets are provided at the front and back of the system respectively, and bypass air is fed to one of the turbojets by switching the air duct.

SUMMARY OF THE INVENTION

The present invention has been contrived in view of such problems of the conventional technology, and it is an object of the present invention to provide a turbofan jet engine for a supersonic aircraft, which is capable of providing a required thrust while reducing the noise generated at takeoff, with small additional drag due to engine installation during a supersonic cruise.

In order to achieve the above object, a turbofan jet engine described in claim 1 has: a core engine that generates a propulsive force by ejecting exhaust gas rearward; and a fan that generates a propulsive force by pushing an air flow rearward suppressing a noise generated in an exhaust jet of the core engine, wherein the fan is composed of a front fan disposed in the vicinity or upstream of a compressor of the core engine, a front fan duct accommodating the front fan, an aft fan disposed in the vicinity or downstream of a turbine thereof, and an aft fan duct accommodating the aft fan, at least either one of the front fan duct and the aft fan duct is designed to be rotatable, and an area of overlap between an outlet of the front fan duct and an inlet of the aft fan duct changes in accordance with the rotation of the front fan duct or the aft fan duct, whereby a bypass ratio of the engine changes.

In the turbofan jet engine described above, the two fans, i.e., the front fan and the aft fan, are disposed in the core engine. The front fan and the aft fan are driven in parallel at takeoff, and external air is introduced to both of the air inlets of the front and aft fans and ejected rearward respectively. On the other hand, during a supersonic cruise, the front and aft fans are driven in series. At least either one of the front and aft fan ducts is rotated so that the area of overlap between the outlet of the front fan duct and the inlet of the aft fan duct is maximized, whereby external air is mainly introduced to the air inlet of the front fan, and the air compressed through the front fan is fed to the aft fan through the air inlet of the aft fan, compressed further through the aft fan, and finally ejected from the nozzle. Accordingly, the bypass ratio of the engine at takeoff is higher than during supersonic cruise. This means that the above engine has a tendency to make lower jet noise at takeoff than the engine where the fan ducts are fixed and the fans always operate in series. Moreover, the above engine induces small supersonic wave drag due to engine installation because of the low bypass ratio during supersonic cruise which makes the frontal area of the engine small as long as the required thrust is constant.

In the turbofan jet engine described in claim 2, the front fan duct and the aft fan duct each have an air inlet and an air outlet separately when the size of the area of overlap is minimum.

In the turbofan jet engine described above, since the front fan duct and the aft fan duct each have an air inlet and an air outlet separately, the bypass airflow is increased and thereby the bypass ratio is increased as compared to when the external air is introduced to the front fan only. Accordingly, the jet exhaust velocity is reduced, and as a result the jet noise can be suppressed.

In the turbofan jet engine described in claim 3, the front fan duct and the aft fan duct are configured such that the inlet of the aft fan duct and the outlet of the front fan duct are coupled to each other when the size of the area of overlap is maximum, whereby the air compressed through the front fan is introduced to the aft fan, and the compressed air is further compressed through the aft fan and ejected rearward.

The turbofan jet engine is configured in the above manner, so that the external air can be introduced only to the air inlet of the front fan duct to compress the external air through the front fan, and the compressed air can be fed to the aft fan to be further compressed through the aft fan and then ejected from the nozzle. Accordingly, a required thrust can be obtained at a smaller bypass ratio. In other words, during the supersonic cruise, a required thrust can be ensured at relatively small front face area of the engine. As a result, supersonic flight can be realized at small additional drag due to the engine installation.

The turbofan jet engine described in claim 4 is configured so as to be able to switch between, during a flight of the aircraft, a first configuration in which the front fan and the aft fan take in external air separately and are thereby operated, and a second configuration in which external air is taken into the front fun duct only and the air compressed through the front fan is introduced to the aft fan, further compressed through the aft fan, and ejected rearward.

The turbofan jet engine is configured in the above manner, so that the jet noise can be suppressed low at takeoff, and supersonic flight can be realized appropriately at small additional drag due to the engine installation.

The turbofan jet engine described in claim 5 is configured such that a part of or the entire jet engine is incorporated in the inside of the aircraft, and a projected area obtained in the second configuration is smaller than that obtained in the first configuration when the entire aircraft including the engines is viewed from the front.

The turbofan jet engine is configured in the above manner, so that the drag during the supersonic flight can be reduced.

In the turbofan jet engine described in claim 6, the outlet of the front fan duct and the inlet of the aft fan duct have the same or a different shape with different phases from each other, and the first configuration and the second configuration can be switched by changing the phase of either one or both of the front and aft fan ducts.

The turbofan jet engine is configured in the above manner, so that the area of overlap between the outlet of the front fan duct and the inlet of the aft fan duct can be changed appropriately.

Since the turbofan jet engine of the present invention is configured as described above, the following effects can be achieved when this turbofan jet engine is applied to an aircraft that cruises at supersonic speeds.

First of all, at takeoff, the front fan and the aft fan can be operated so that external air may be introduced to the front and aft fans separately, thus the bypass airflow is increased and thereby the bypass ratio is increased as compared to when the external air is introduced to the front fan only. Accordingly, the jet exhaust velocity obtained when generating a thrust required for takeoff is reduced, and, as a result, the jet noise can be suppressed. On the other hand, during the supersonic cruise, the external air is taken into the front fan duct only. In this case, air inlet of the aft fan duct and the air outlet of the front fan duct are coupled to each other, whereby the air compressed through the front fan is introduced to the aft fan, and is further compressed through the aft fan and ejected from the nozzle. Accordingly, the bypass ratio becomes small as compared to the configuration at takeoff in which the external air is introduced to both of the front and aft fans. As the results, a thrust required for a supersonic cruise can be ensured at relatively small front face area of the engine, which suppresses the increase in the additional drag due to the engine installation during the supersonic cruise.

In addition, the aircraft that has incorporated therein a part of or the entire turbofan jet engine of the present invention is configured such that the projected area of the configuration at a supersonic cruise is smaller than that at take off when the entire aircraft is viewed from the front. Accordingly, the total drag of the aircraft flying at supersonic speeds can be reduced.

BRIEF DESCRIPTION OF THE DRAWINGS

FIG. 2 is an explanatory diagram of the substantial cross-sectional portion of the turbofan jet engines of the present invention.

FIG. 3 is an explanatory diagram of a substantial perspective figure of the turbofan jet engine of the present invention, FIG. 4 is an explanatory diagram of the substantial cross-sectional portion of the turbofan jet engine of the present invention in which the turbofan jet engine is incorporated in the inside of a wing.

DESCRIPTION OF THE PREFERRED EMBODIMENTS

Figure 1:
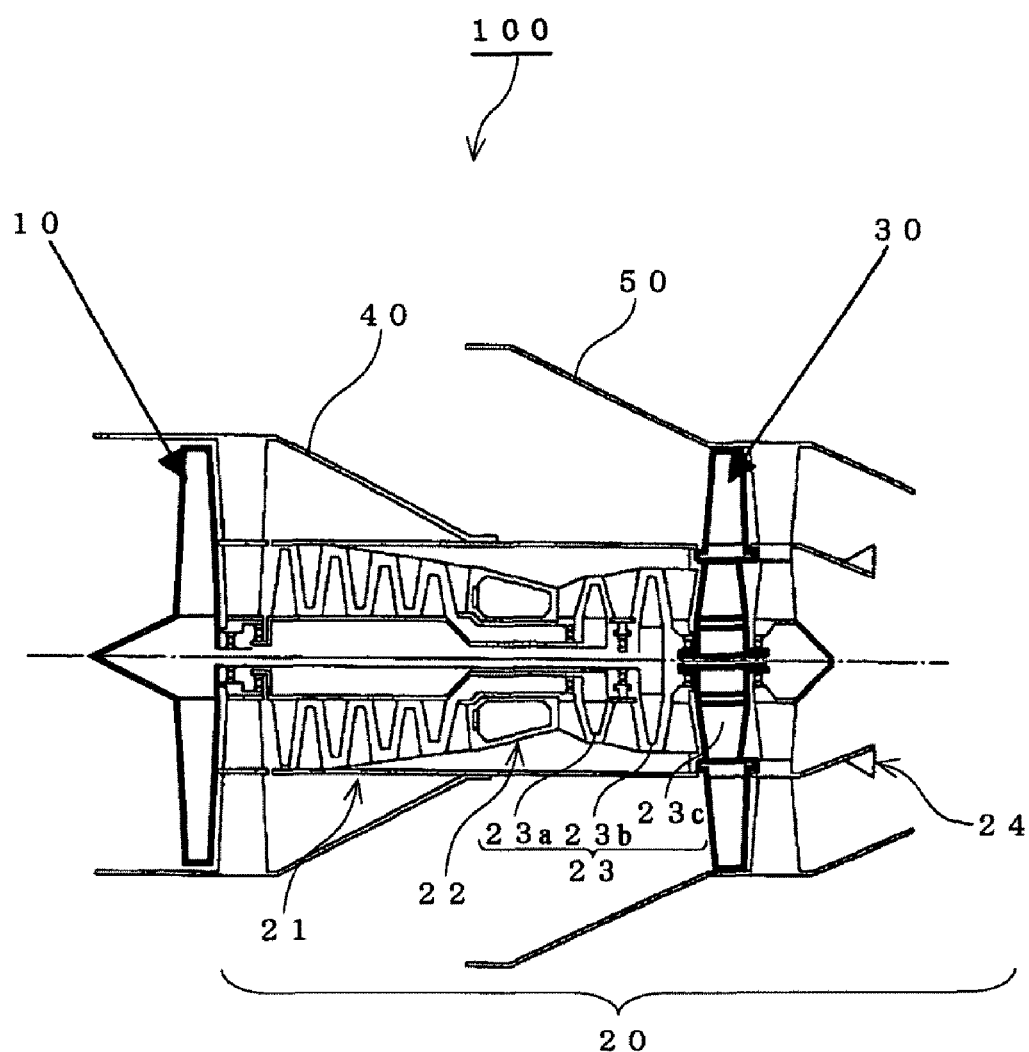
FIG. 1 is an explanatory diagram showing a substantial cross-sectional portion of the turbofan jet engine of the present invention.

FIG. 1 is an explanatory diagram showing a substantial cross-sectional portion of a turbofan jet engine 100 of the present invention.

This turbofan jet engine 100 comprises: a front fan 10 that compresses the inlet air and supply a part of the compressed air to a core engine 20 and ejects the remaining airflow to the bypass duct; a front fan duct 40 that accommodates the front fan 10; the core engine 20 constituted by a compressor 21, a combustor 22, a turbine 23 and an exhaust nozzle 24; an aft fan 30 that compresses the received airflow; and an aft fan duct 50 that accommodates the aft fan 30 and is designed to be rotatable.

The front fan 10 is driven by a low-pressure turbine 23b disposed behind a high-pressure turbine 23a. The compressor 21 is driven by the high-pressure turbine 23a.

The aft fan 30 is disposed on an end section of an outer circumference of a turbine 23c, and driven in complete synchronization with rotation of the turbine 23c.

Figure 2A:
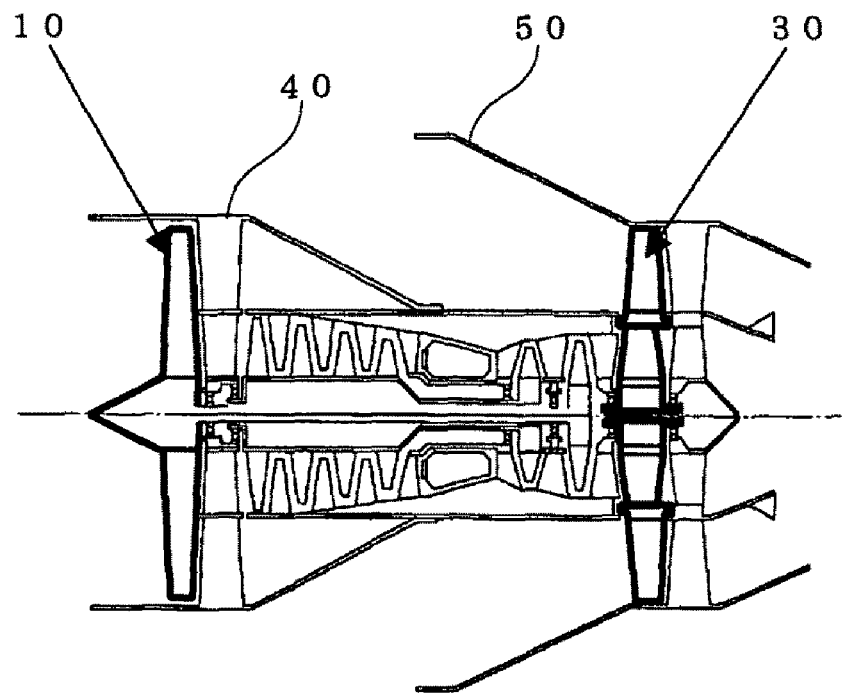
FIG. 2A represents the first configuration at take off, explained above, where the bypass ratio is high
Figure 2B:
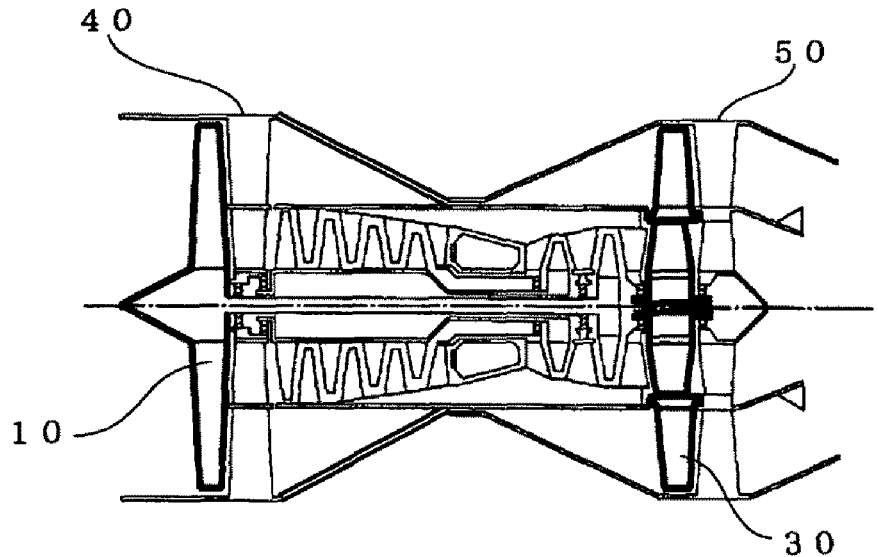
FIG. 2B represents the second configuration during a supersonic cruise where the bypass ratio is low.

Regarding the front fan duct 40, described hereinafter in detail with reference to FIGS. 2 through 4, an inlet thereof has a circular shape, while an outlet of the same has a horizontally long rectangular shape having a large aspect ratio. Also, a duct internal wall between the inlet and the outlet has an aerodynamically smooth shape. The front fan 10 and the aft fan 30 are driven in parallel such that the outlet of the front fan duct 40 does not overlap with an inlet of the aft fan duct 50 at takeoff. Accordingly, the bypass ratio is increased at takeoff, and a large amount of bypass air flows at the periphery of a jet exhaust stream of the core engine 20. On the other hand, during a supersonic cruise, the outlet of the front fan duct 40 and the inlet of the aft fan duct 50 are coupled to each other, whereby the air compressed through the front fan 10 is introduced to the aft fan 30 to be further compressed therein, and then ejected rearward. Not only can the jet noise be reduced appropriately, but also a required thrust can be provided by the engine with a small frontal area because the bypass ratio becomes low during the supersonic cruse which results in the reduction of the additional drag due to the engine installation during the supersonic cruise.

Regarding the aft fan duct 50, described hereinafter in detail with reference to FIGS. 2 through 4, the inlet thereof has a vertically long rectangular shape having a small aspect ratio at takeoff, but this shape is changed to a horizontally long rectangular shape by rotating for ±90 degrees so that this inlet is coupled to the outlet of the front fan duct 40 during the supersonic cruise. It should be noted that the outlet portion of the aft fan duct 50 has a circular shape.

Figure 4A:
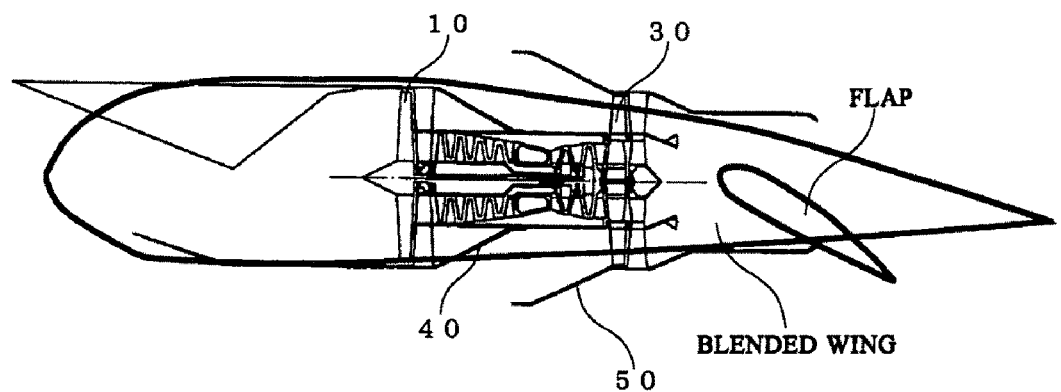
FIG. 4A represents the configuration at takeoff and FIG. 4B represents the configuration during a supersonic cruise.
Figure 4B:
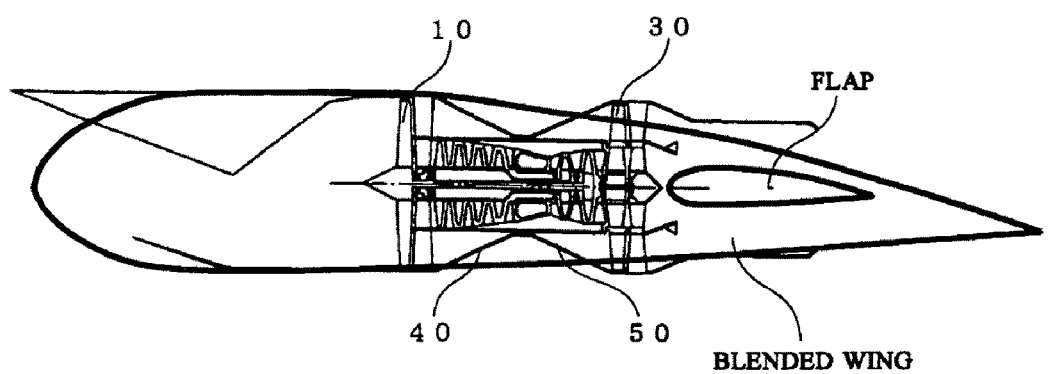

This turbofan jet engine 100 is embedded in a wing, as shown in FIG. 4. FIG. 4A shows a configuration of the front fan duct 40 and aft fan duct 50 at takeoff, while FIG. 4B shows a configuration of the same during a supersonic cruise. It should be noted that this turbofan jet engine may be embedded in a pylori, fuselage, or other part constituting the aircraft, or may be simply attached to an upper part or a lower part of the aircraft.

Figure 3A:
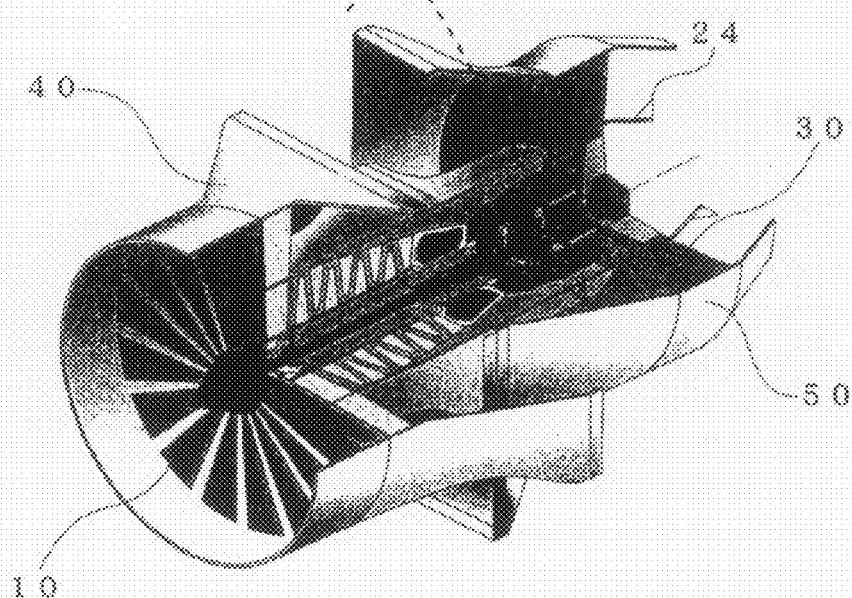
FIG. 3A represents the first high bypass ratio configuration at takeoff and FIG. 3B represents the second low bypass ratio configuration during a supersonic cruise.
Figure 3B:
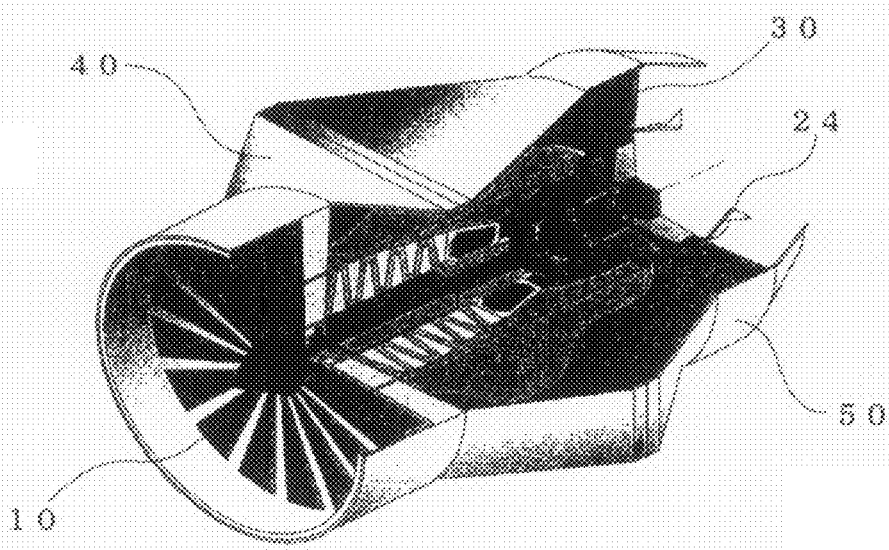

As shown in FIG. 3, the inlet of the front fan duct 40 has a circular shape, while the outlet of the same has a rectangular shape, and the inlet of the aft fan duct 50 has a rectangular shape, while the outlet of the same has a circular shape. At takeoff, the front fan duct 40 and the aft fan duct 50 are in the high bypass ratio configuration in which these fan ducts take in air separately, as shown in FIG. 3A. During the supersonic cruise, on the other hand, the front fan duct 40 and the aft fan duct 50 are in the low bypass ratio configuration in which the outlet of the front fan duct 40 is coupled to the inlet of the aft fan duct 50, and the external air is introduced to the front fan duct 40 only and then compressed through both of the front fan 10 and the aft fan 30, as shown in FIG. 3B. As can be seen by comparing FIGS. 3A and 3B, the front view area of the engine is set to be smaller during the supersonic cruise than at takeoff. FIG. 4 shows a state in which the engine is incorporated in the inside of the wing. The area of the front face of the entire aircraft is set to be small when the air inlet of the front fan duct 40 overlaps with the wing.

The inlet cross-sectional shape of the aft fan duct 50 is designed such that the aft fan duct may smoothly receive air flowing out of the front fan duct. In this case, the outlet of the front fan duct 40 and the inlet of the aft fan duct 50 do not have to joint completely. For example, when the amount of airflow required in the aft fan 30 is greater than the airflow flowing out of the front fan duct 40, the inlet of the aft fan duct 50 is set to be smaller than the outlet of the front fan duct 40. When, on the contrary, the amount of airflow required in the aft fan 30 is smaller than the amount of airflow flowing out of the front fan duct 40, the inlet of the aft fan duct 50 is set to be larger than the outlet of the front fan duct 40 in order to introduce additional external air to the aft fan.

The front fan duct 40 is configured to have an aerodynamically smooth duct shape downstream of the fan blades where the cross-sectional shape slowly changes from circular to rectangular, and is also configured to have a shape so that the total pressure loss due to the flow separation or a secondary flow around the corner can be minimized. When wishing to reduce length of the duct, boundary layer control may be performed on the duct internal wall by putting vortex generators, sucking air from the wall surface and ejecting the air. Furthermore, in the case in which a strong secondary swirling flow emerges due to a rapid change in the cross-sectional shape of the duct, installation of additional guide vanes may be considered to suppress the swirling.

Moreover, the aft fan duct 50 is configured to have an aerodynamically smooth duct shape upstream of the fan rotor section so that the cross-sectional shape thereof slowly changes from rectangular to circular, and is also configured to have a shape to prevent the total pressure loss due to separation or a secondary flow around a corner. When wishing to reduce length of the duct, boundary layer control may be performed on the duct internal wall by putting vortex generators, sucking air from the wall surface and ejecting the air. Furthermore, in the case in which a strong swirling flow emerges due to a rapid change in the cross-sectional shape of the duct, additional guide vanes for controlling the flow may considered to be mounted upstream of the fan rotor section.

The aft fan duct 50 is configured to be rotatable during a flight. At takeoff, as shown in FIG. 3A, the shape of the inlet of the aft fan duct 50 becomes a vertically long rectangular shape as viewed from the front, and the air flowing out of the front fan duct 40 is discharged to the outside while the aft fan duct 50 is also set to introduce air from outside and eject it rearward.

During the supersonic cruise, on the other hand, as shown in FIG. 3B, the shape of the inlet of the aft fan duct 50 becomes a horizontally long rectangular shape as viewed from the front, and the air flowing out of the front fan duct 40 flows into the inlet of the aft fan duct 50. Specifically, the area of the front face of the engine is set to be small during the supersonic cruise.

In the case in which the turbofan jet engine 100 is applied to an aircraft that cruises at supersonic speeds, the following effects are obtained.

At takeoff, the front fan 10 and the aft fan 30 separately take in air from the outside and are thereby operated, thus the bypass airflow is increased and thereby the bypass ratio is increased as compared to when the external air is introduced to the front fan 10 only. Accordingly, the jet exhaust velocity is reduced, and as a result the jet noise can be suppressed. On the other hand, during the supersonic cruise, the air inlet of the aft fan duct 50 and the air outlet of the front fan duct 40 are coupled to each other, whereby the air compressed through the front fan 10 is introduced to the aft fan 30, and the compressed air is further compressed through the aft fan 30 and ejected from the nozzle. Accordingly, the bypass ratio becomes small as compared to the situation at takeoff making it possible that a required thrust is provided by the engine with a small frontal area which results in the reduction of the additional drag due to the engine installation during the supersonic cruise.

The turbofan jet engine of the present invention can be applied appropriately as a turbofan jet engine for an aircraft, and particularly as a propulsion turbofan jet engine for an aircraft that flies at supersonic speeds during a cruise.

What is claimed is:

1. A turbofan jet engine, comprising:
   a core engine that generates a propulsive force by ejecting exhaust gas rearward; and
   a fan that generates a propulsive force by pushing an air flow rearward, and suppresses a noise of an exhaust jet of the core engine,
   wherein the fan comprises a front fan disposed in the vicinity or upstream of a compressor of the core engine, a front fan duct accommodating the front fan, an aft fan disposed in the vicinity or downstream of a turbine thereof, and an aft fan duct accommodating the aft fan,
   at least either one of the front fan duct and the aft fan duct is rotatable, and
   an area of overlap between an outlet of the front fan duct and an inlet of the aft fan duct changes in accordance with the rotation of the front fan duct or the aft fan duct, whereby a bypass ratio of the engine changes.

2. The turbofan jet engine according to claim 1, wherein the front fan duct and the aft fan duct each have an air inlet and an air outlet separately when the size of the area of overlap is minimum.

3. The turbofan jet engine according to claim 1, wherein the front fan duct and the aft fan duct are configured such that the inlet of the aft fan duct and the outlet of the front fan duct are coupled to each other when the size of the area of overlap is maximum, whereby air compressed through the front fan is introduced to the aft fan, and the compressed air is further compressed through the aft fan and ejected rearward.

4. The turbofan jet engine according to any of claims 1 through 3, wherein the turbofan jet engine is configured so as to be able to switch between, during a flight of the aircraft, a first configuration in which the front fan and the aft fan separately take in external air and are thereby operated in parallel, and a second configuration in which the front and aft fans are operated in series so that the air compressed through the front fan is introduced to the aft fan, further compressed through the aft fan, and ejected rearward.

5. The turbofan jet engine according to claim 4, wherein a part of or the entire turbofan jet engine is incorporated in the inside of the aircraft, and a projected area obtained in the second configuration is smaller than that obtained in the first configuration when the entire aircraft is viewed from the front.

6. The turbofan jet engine according to claim 5, wherein the outlet of the front fan duct and the inlet of the aft fan duct have the same or a different shape with different phases from each other, and the first and second configurations can be switched by changing the phase of either one or both of the front and aft fan ducts.

* * * * *